G. T. ALLISON.
COMBINED HOG TRAP, OPERATING TABLE, AND LOADING CHUTE.
APPLICATION FILED JULY 13, 1907.
902,638.
Patented Nov. 3, 1908.
2 SHEETS—SHEET 1.
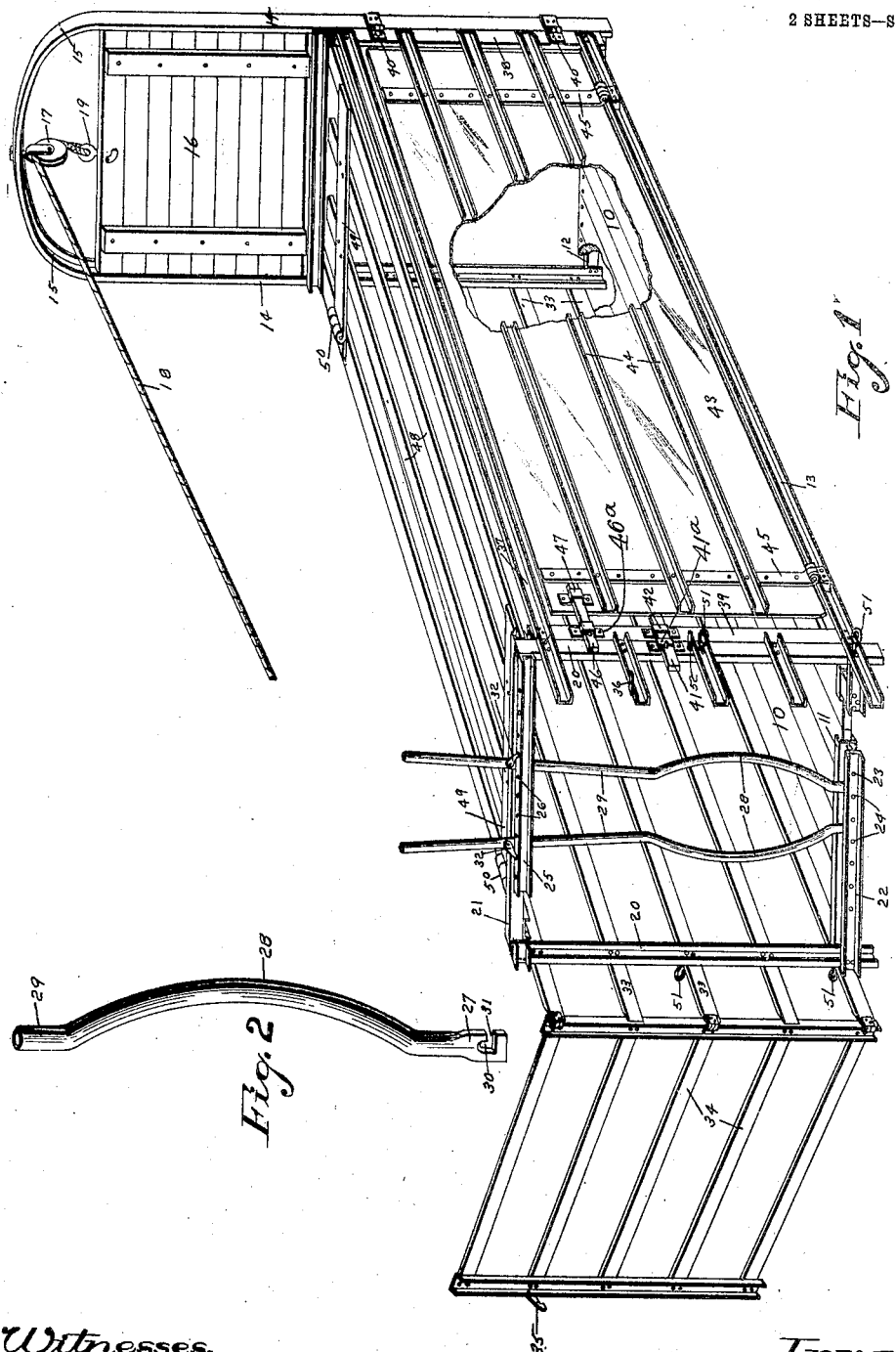

G. T. ALLISON.
COMBINED HOG TRAP, OPERATING TABLE, AND LOADING CHUTE.
APPLICATION FILED JULY 13, 1907.

902,638.

Patented Nov. 3, 1908.

2 SHEETS—SHEET 2.

UNITED STATES PATENT OFFICE.

GUY T. ALLISON, OF AMES, IOWA.

COMBINED HOG-TRAP, OPERATING-TABLE, AND LOADING-CHUTE.

No. 902,638.  Specification of Letters Patent.  Patented Nov. 3, 1908.

Application filed July 13, 1907. Serial No. 383,617.

*To all whom it may concern:*

Be it known that I, GUY T. ALLISON, a citizen of the United States, residing at Ames, in the county of Story and State of Iowa, have invented a certain new and useful Combined Hog-Trap, Operating-Table, and Loading-Chute, of which the following is a specification.

The object of my invention is to provide a device of the class described, of simple, durable and inexpensive construction, into which hogs or other animals may be driven, and the end-gate at the rear of the trough may be dropped by an operator at the front end thereof, and the animals firmly held by means of stanchions at the front of the trap, which may also be moved by the same operator.

A further object is to provide a device of this kind having in one side an operating table so arranged that after an animal has entered the trap, it may quickly and easily be drawn by ropes or the like, against the side of the trap containing the operating table, and then said operating table may be swung outwardly and downwardly so that the operators may have access to the animal thereon, and a further object is to provide improved means for connecting supports with the front of the trap so that the rear end of the trap may be left open, and the stanchion at the front of the trap may be detached and the device then used as a hog loading chute.

My invention consists in the construction, arrangement and combination of the various parts of the device, whereby the objects contemplated are attained, as hereinafter more fully set forth, pointed out in my claims and illustrated in the accompanying drawings, in which—

Figure 3:
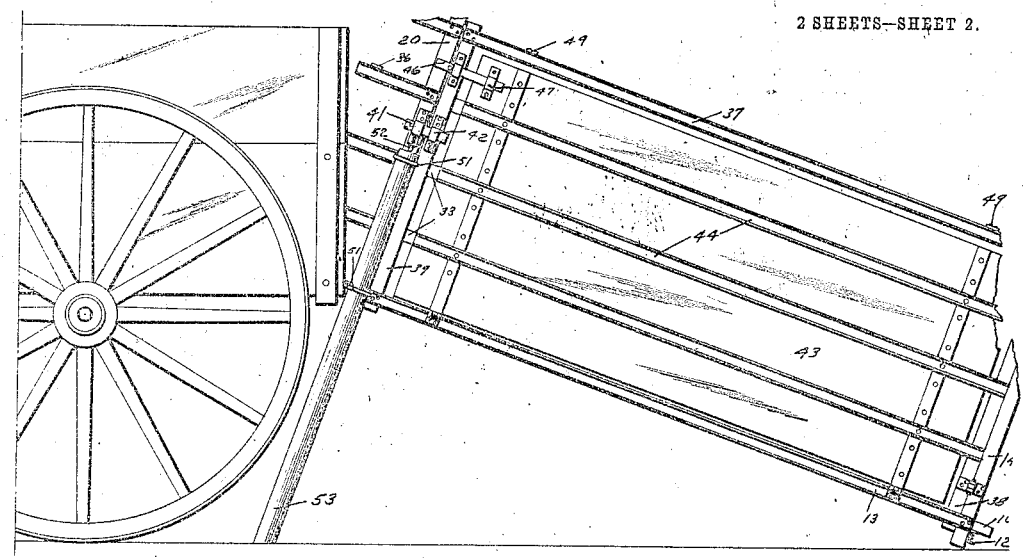
Figure 4:
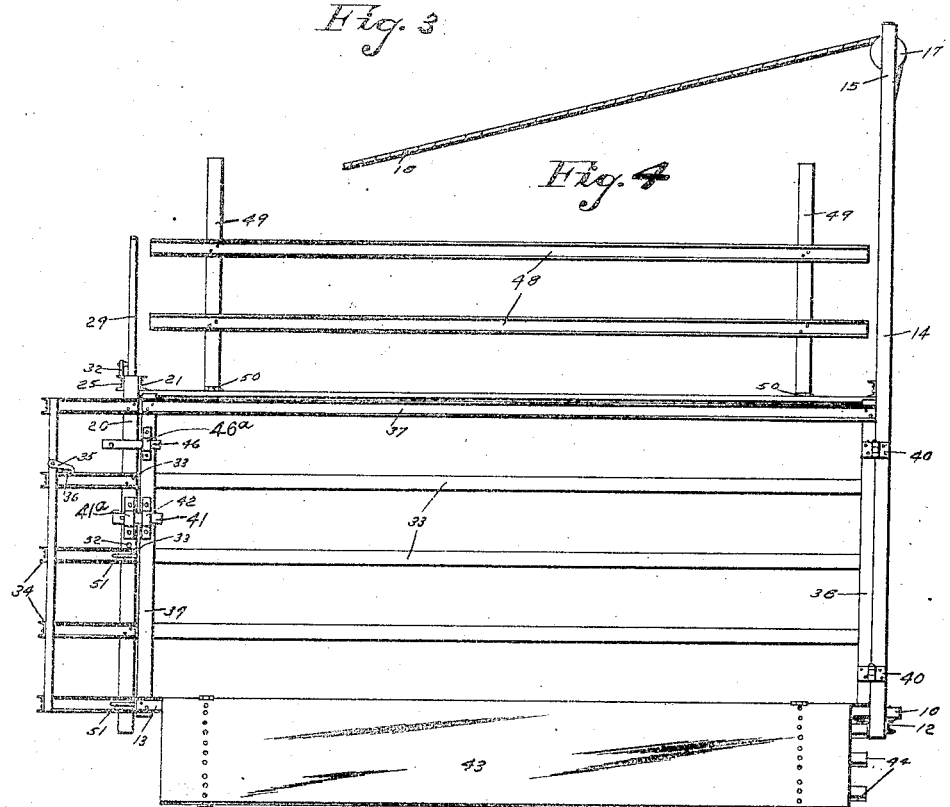

Figure 1 shows a perspective view of the complete device embodying my invention, a part of one side being broken away to show certain details of construction. Fig. 2 shows an enlarged perspective view of the lower portion of one of the stanchions. Fig. 3 shows a side elevation of a part of a wagon, and my improved device supported adjacent thereto, in position for use as a hog loading chute, and Fig. 4 shows a side elevation of the device in position for use as an operating table.

Referring to the accompanying drawings, I have used the reference numeral 10 to indicate the platform of the device supported by means of a rectangular frame formed of metallic channel bars. The channel bar at the front is indicated by the numeral 11, and has its open side facing the interior of the trap, and the platform 10 is inserted in said channel bar. The channel bar at the rear is indicated by the numeral 12, and has the platform 10 placed on top of it, and the channel bars at the sides are indicated by the numeral 13, and extend a short distance in front of the platform 10. At the rear of the device is a channel bar 14, its sides being connected to the platform 10 and extended upwardly a considerable distance above the top of the trap, and at the top of said sides is an arch 15 connecting the said sides, the open side of the channel bar forming the sides being on the inner side. Slidingly mounted in this channel bar is a rear end-gate 16, and supported at the top of the arch 15 is a pulley 17, over which a rope 18 is passed, and connected by an eye-bolt 19 with said end-gate. This rope is extended to the forward end of the trap so that the rear end-gate may be raised or lowered by an operator at the front of the trap. At the front of the trap is a rectangular frame composed of the sides 20, the said channel bar 11 and a channel bar 21 at the top. Adjacent to the channel bar 11, is a channel bar 22 slightly spaced apart from the channel bar 11, and formed with a series of openings 23 designed to receive pins 24, and spaced apart from the channel bar 21 at the top is a channel bar 25 having openings 26 in its top. I have provided stanchions for holding the animals within the trap as follows: Each stanchion is preferably made of a piece of tubular metal and comprises a lower end 27, a curved body portion 28, and the straight handle 29. The part 27 is provided with an opening 30 having a slot 31 leading from said opening to the adjacent side of the part 27. In this way the lower ends of the stanchions may be detachably pivoted to the pins 24. Pivoted to each of the handle portions 29 is a pawl 32 designed to engage the openings 26. In this way the upper ends of the stanchions may be adjusted relative to each other, and held toward each other in any position of their adjustment.

One side of the trap is formed of a series of parallel channel bars 33 fixed to one of the channel bars 14 at the rear, and to one of the channel bars 20 at the front, and their forward ends are extended a slight distance in front of the channel bar 20. A front gate 34 is hinged to the forward ends of the side bars 33. This gate is provided with a latch 35 to engage the hook 36 at the opposite side of the trap. The other side of the trap is formed of an upper channel bar 37, two upright channel bars 38 and 39, and the lower channel bar 13. The lower and upper channel bars 37 and 13 extend only as far as the upright 20 at the front, and short extensions of these bars are fixed to the upright 20 to project a short distance in front of the upright 20. The frame thus formed of the parts 13, 37, 38 and 39 are connected by hinges 40 with the rear upright 14 to swing horizontally outward. I provide for holding the swinging gate thus formed in position, by means of a slide bolt 41 mounted in a suitable support 41$^a$ on the upright 20, and designed to enter a keeper 42 on the upright 39. The remainder of this side of the trap is formed of a flat sheet metal table 43 having reinforcing channel bars 44 on its side, and connected by hinges 45 with the lower channel bar 13, said hinges being designed to permit the table to swing outwardly and downwardly to a horizontal position. This table 43 may be held in position parallel with the side of the trap by means of the slide bolt 46 mounted in a support 46$^a$ on the upright 39, and designed to enter a keeper 47 secured to the table 43. The top of the trap is formed of a series of channel bars 48, connected by the straps 49, which are hinged to the stationary side of the trap by the hinges 50 so that the top may swing upwardly and outwardly as shown in Fig. 4. I have also provided for adapting the device for use as a hog loading chute as follows: Fixed to the sides of the uprights 20 are two loops 51, and above the upper loop 51 is a pin 52. When in use as a loading chute, the supports 53 are extended upwardly through these loops with their upper ends in engagement with the pins 52, as shown in Fig. 3.

Assuming that the device is intended to be used as a trap for catching and holding hogs for the purpose of placing rings in the animals noses, I proceed as follows: The rear end-gate 16 is elevated, the top and sides are closed, and the gate 34 at the front is opened, then animals are driven into the trap through the rear end, and as soon as they enter the trap the operator at the front releases the rope 18 to drop the rear gate, then when the animal's head is projected between the stanchions, the operator grasps the levers and draws them together until they firmly hold the animal's neck. As soon as the operation of ringing the hog is completed, the operator releases the slide bolt 41 and permits the side to swing outwardly, and he then releases the animal from the stanchion and permits it to escape through the open side of the trap. Assuming that it is desired to use the trap as an operating device, then the gate at the front is closed, and after the animal enters the trap, the rear gate is closed in the same manner as before described. Then the operator opens the hinged top of the trap and passes ropes around the animal's body and above and below the table 43 at the side. These ropes are then drawn tight around the animal, and around the table 43, and tied. Then the operator releases the slide bolt 46 and permits the table to swing downwardly to a horizontal position with the animal firmly held thereon, and when in this position, the operator may have ready access to the animal for the purpose of performing an operation. If it is desired to use the device as a loading chute, the stanchions are detached by first slightly elevating them, and then moving their lower ends outwardly so that they disengage from the pins 24, then said stanchions may be drawn upwardly and removed. The front end-gate and the rear end-gate are held open, and the supports 53 are connected with the loops 51 as before described, then the device may be placed adjacent to a wagon, and animals driven into the rear end thereof, and loaded into the wagon.

Having thus described my invention, what I claim and desire to secure by Letters Patent of the United States, therefore, is—

1. In a device of the class described, the combination of a front channel bar, a solid platform inserted in the channel bar, a rear channel bar having the solid platform fixed on top of it, suitable sides and top, and stanchion bars pivotally connected with the front channel bar.

2. In a device of the class described, the combination of a front channel bar, a solid platform inserted in the channel bar, a rear channel bar having the solid platform fixed on top of it, suitable sides and top, and stanchion bars pivotally connected with the front channel bar, a channel bar having upright sides fixed to the rear of the device, a sliding end gate mounted in said channel bar, a pulley above the end-gate, and a rope passed over the pulley, extended toward the front of the device, and attached to said end-gate.

3. In a device of the class described, the combination of a frame, one side of the frame being hinged to swing in a horizontal plane, the said hinged side being provided with an operating table therein and forming part thereof, and hinged thereto to swing outwardly and downwardly, a latch for connecting said hinged side to the main frame, and a latch for connecting said operating table to the hinged side.

4. In a device of the class described, the combination of a frame, pivoted stanchion bar at the front thereof, a hinged front for the frame, a hinged top for the frame, a vertical movable end-gate at the rear of the frame, a hinged side for the frame to swing in a horizontal plane, and an operating table forming part of said hinged side, and hinged thereto, to swing outwardly and downwardly.

5. In a device of the class described, the combination of a frame comprising a top, bottom and sides, two loops fixed to each side at its forward end, in line with each other, a pin in each side above the upper loop and supports designed to be extended through said loops and to engage said pin for supporting the forward end of the frame in an elevated position.

Des Moines, Iowa, June 10, 1907.

GUY T. ALLISON.

Witnesses:
J. E. BENNETT,
S. G. KEENAN.